(12) United States Patent
Kinoshita

(10) Patent No.: US 9,946,610 B2
(45) Date of Patent: Apr. 17, 2018

(54) MEMORY DEVICE AND METHOD FOR SAVING AND RESTORING DATA USING NONVOLATILE MEMORY

(71) Applicant: Toshiba Memory Corporation, Minato-ku, Tokyo (JP)

(72) Inventor: Tadaaki Kinoshita, Kamakura Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 86 days.

(21) Appl. No.: 14/936,356

(22) Filed: Nov. 9, 2015

(65) Prior Publication Data

US 2017/0060706 A1   Mar. 2, 2017

(30) Foreign Application Priority Data

Aug. 28, 2015  (JP) ................. 2015-169090

(51) Int. Cl.
*G06F 11/00* (2006.01)
*G06F 11/16* (2006.01)
*G06F 11/20* (2006.01)

(52) U.S. Cl.
CPC ...... *G06F 11/1666* (2013.01); *G06F 11/2069* (2013.01); *G06F 2201/805* (2013.01)

(58) Field of Classification Search
CPC .......................... G06F 11/1666; G06F 11/2069
See application file for complete search history.

(56) References Cited

U.S. PATENT DOCUMENTS

| 7,971,014 B2 | 6/2011 | Yoshii et al. |
| 2010/0162080 A1* | 6/2010 | Kinoshita ........... G06F 11/1016 714/763 |
| 2011/0197018 A1* | 8/2011 | Noh ......................... G06F 1/30 711/103 |
| 2013/0227201 A1* | 8/2013 | Talagala .............. G06F 12/0246 711/103 |
| 2013/0346793 A1* | 12/2013 | Flynn .................. G06F 11/1008 714/6.3 |
| 2015/0019908 A1* | 1/2015 | Heo .................... G06F 11/1458 714/15 |

(Continued)

FOREIGN PATENT DOCUMENTS

| JP | 2000-222290 A | 8/2000 |
| JP | 2006-338083 A | 12/2006 |
| JP | 2010-026674 A | 2/2010 |

*Primary Examiner* — Elmira Mehrmanesh
(74) *Attorney, Agent, or Firm* — White & Case LLP

(57) ABSTRACT

According to one embodiment, a memory device saves data of a volatile memory to a first nonvolatile memory in response to an event of power loss. After recovery of power, based on management data indicating a relationship between an identifier of each of programs executed by a host system and address data of each of a plurality of regions of the volatile memory being used respectively by the programs, the memory device identifies a region of the first nonvolatile memory where the data of the region of the volatile memory being used by a first program of the programs before the power loss has been saved. The memory device restores the data stored in the identified region into a first region of the volatile memory newly allocated to the first program by the host system.

10 Claims, 10 Drawing Sheets

(56) References Cited

U.S. PATENT DOCUMENTS

2015/0095552 A1\* 4/2015 Chinnakkonda
 Vidyapoornachary
 ............................ G11C 14/009
 711/103
2015/0103599 A1\* 4/2015 Kim ....................... G11C 16/26
 365/185.12

\* cited by examiner

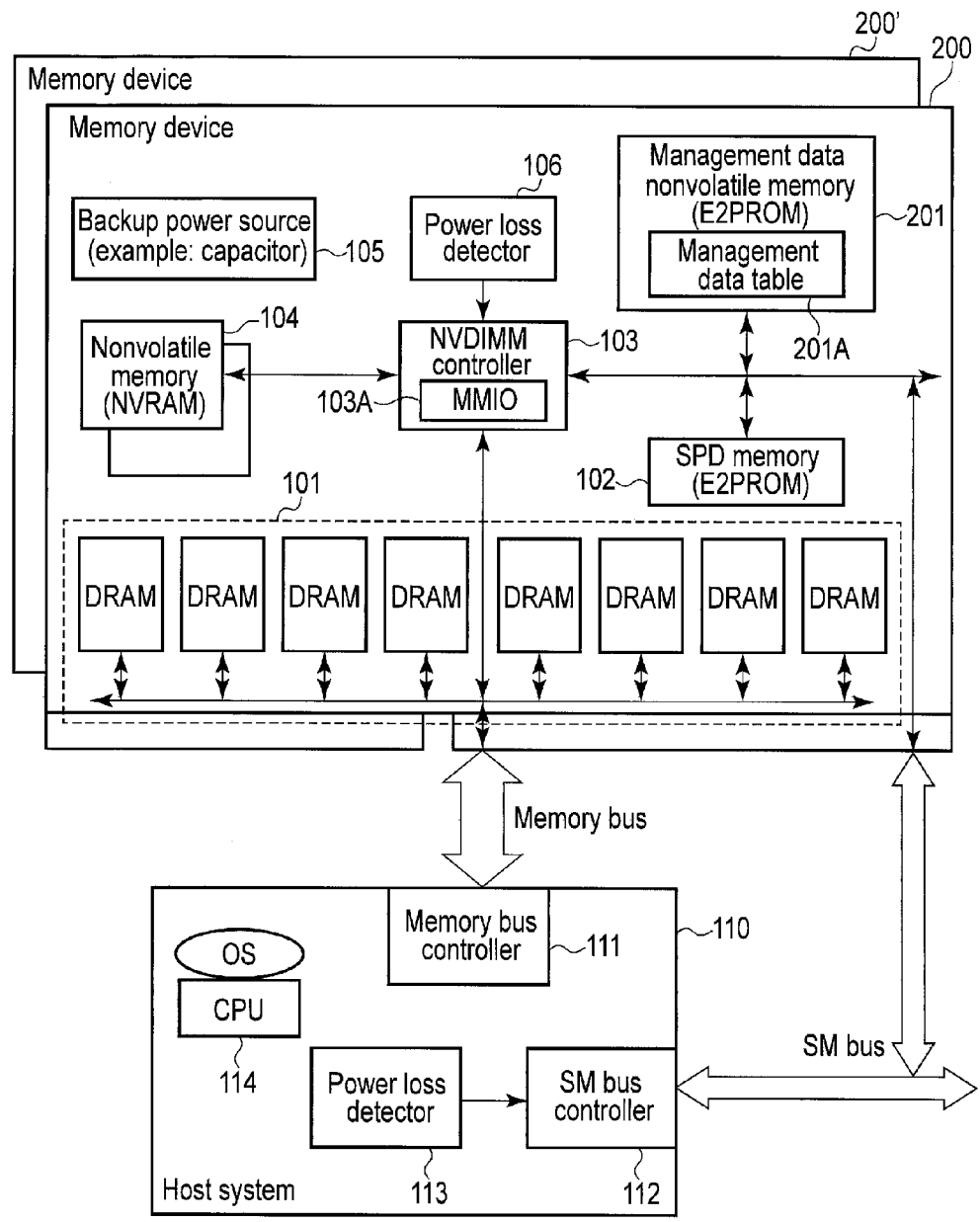
F I G. 1

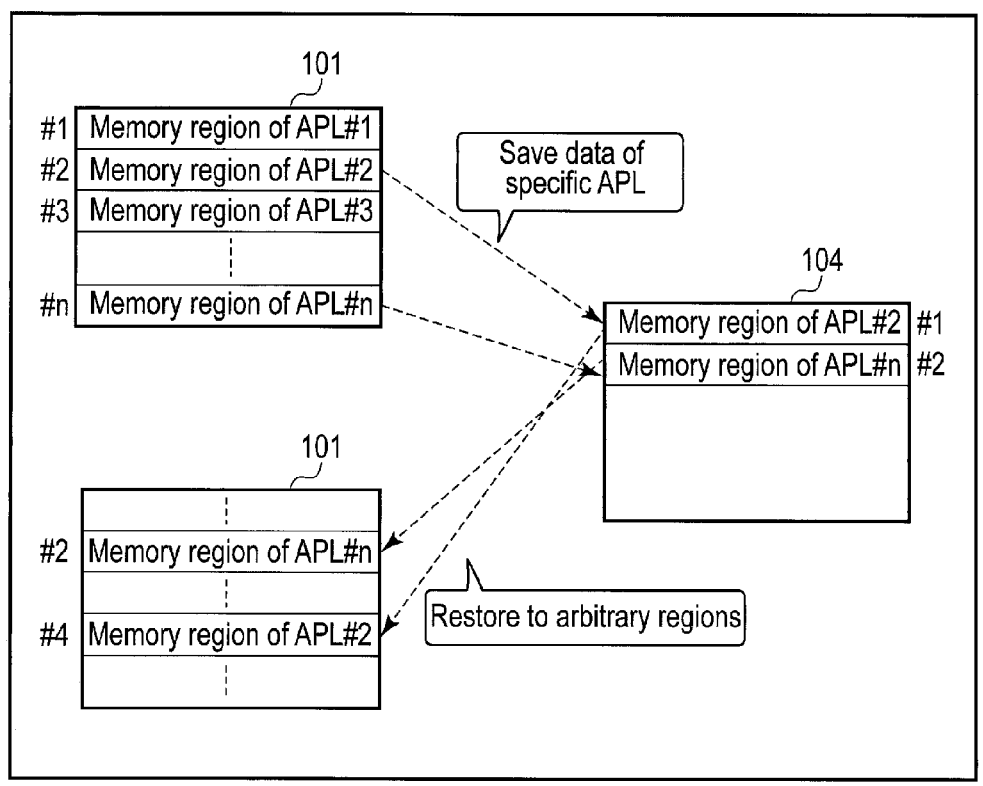
F I G. 4

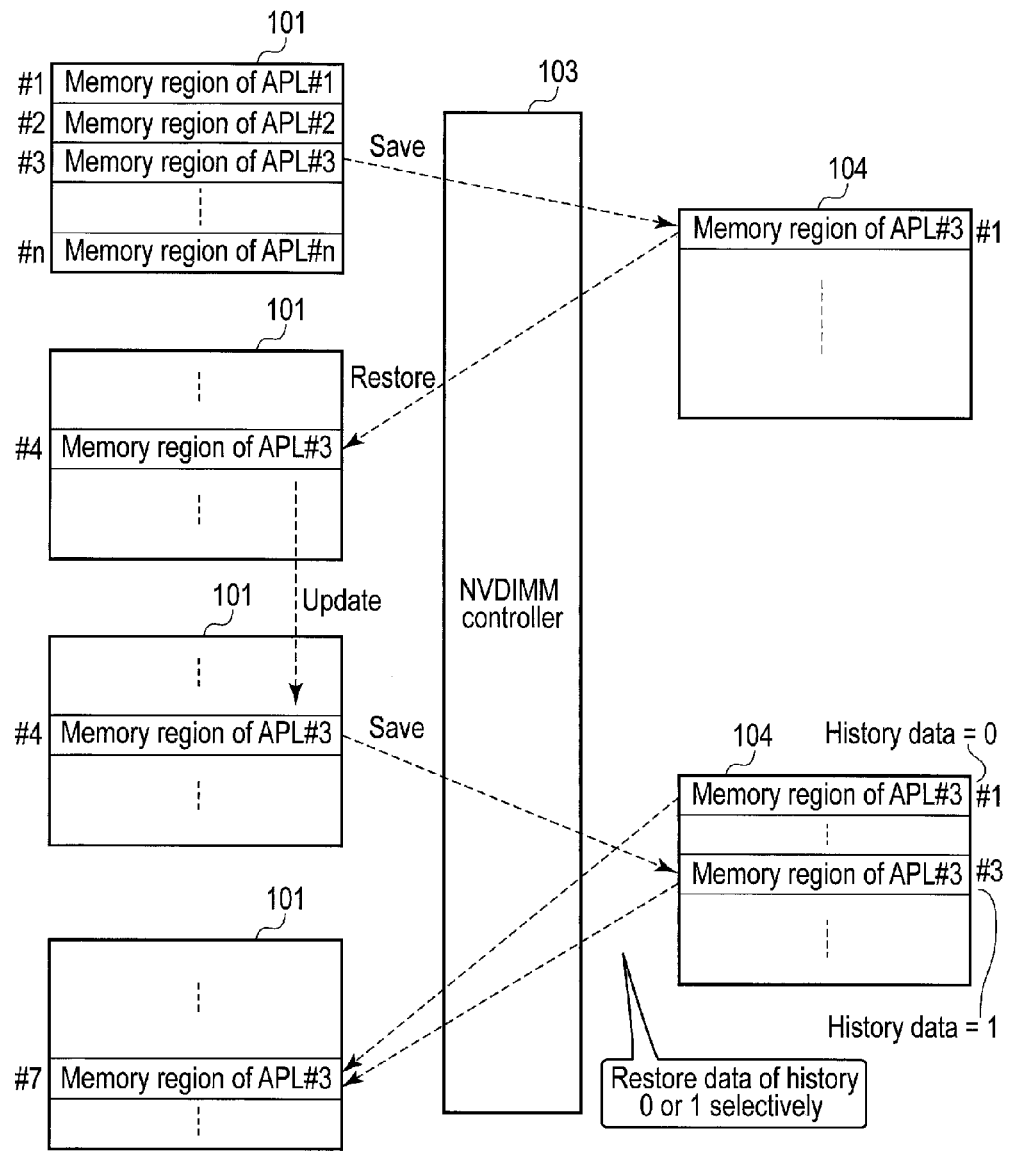
F I G. 5

| Index | Application ID | DIMM address | Offset | NVRAM address |
|---|---|---|---|---|
| 0 | System | 0x0000_0000 | 0x0000_1000 | 0x0000_0000 |
| 1 | Database | 0x0000_1000 | 0x0000_F000 | 0x0000_1000 |
| 2 | Word processor | 0x0001_0000 | 0x0008_0000 | 0x0001_0000 |
| .... | .... | .... | .... | .... |
| 12 | Memory cache | 0x3000_00000 | 0x0003_0000 | 0x0002_0000 |
| 13 | Memory cache | 0x0303_0000 | 0x0004_0000 | 0x0017_0000 |
| 14 | Spread sheet | 0x0307_0000 | 0x0001_0000 | 0x2000_0000 |
| 15 | Final | (Don't care) | (Don't care) | (Don't care) |

F I G. 9

| Index | Application ID | Application history | DIMM address | Offset | NVRAM address |
|---|---|---|---|---|---|
| 0 | System | 0x0 | 0x0000_0000 | 0x0000_1000 | 0x0000_0000 |
| 1 | Database | 0x0 | 0x0000_1000 | 0x0000_F000 | 0x0000_1000 |
| 2 | Word processor | 0x0 | 0x0001_0000 | 0x0008_0000 | 0x0001_0000 |
| .... | .... | .... | .... | .... | .... |
| 12 | Memory cache | 0x0 | 0x3000_00000 | 0x0003_0000 | 0x0002_0000 |
| 13 | Memory cache | 0x1 | 0x0303_0000 | 0x0004_0000 | 0x0017_0000 |
| 14 | Spread sheet | 0x0 | 0x0307_0000 | 0x0001_0000 | 0x2000_0000 |
| 15 | Final | 0x0 | (Don't care) | 0x0000_0000 | (Don't care) |

FIG. 11

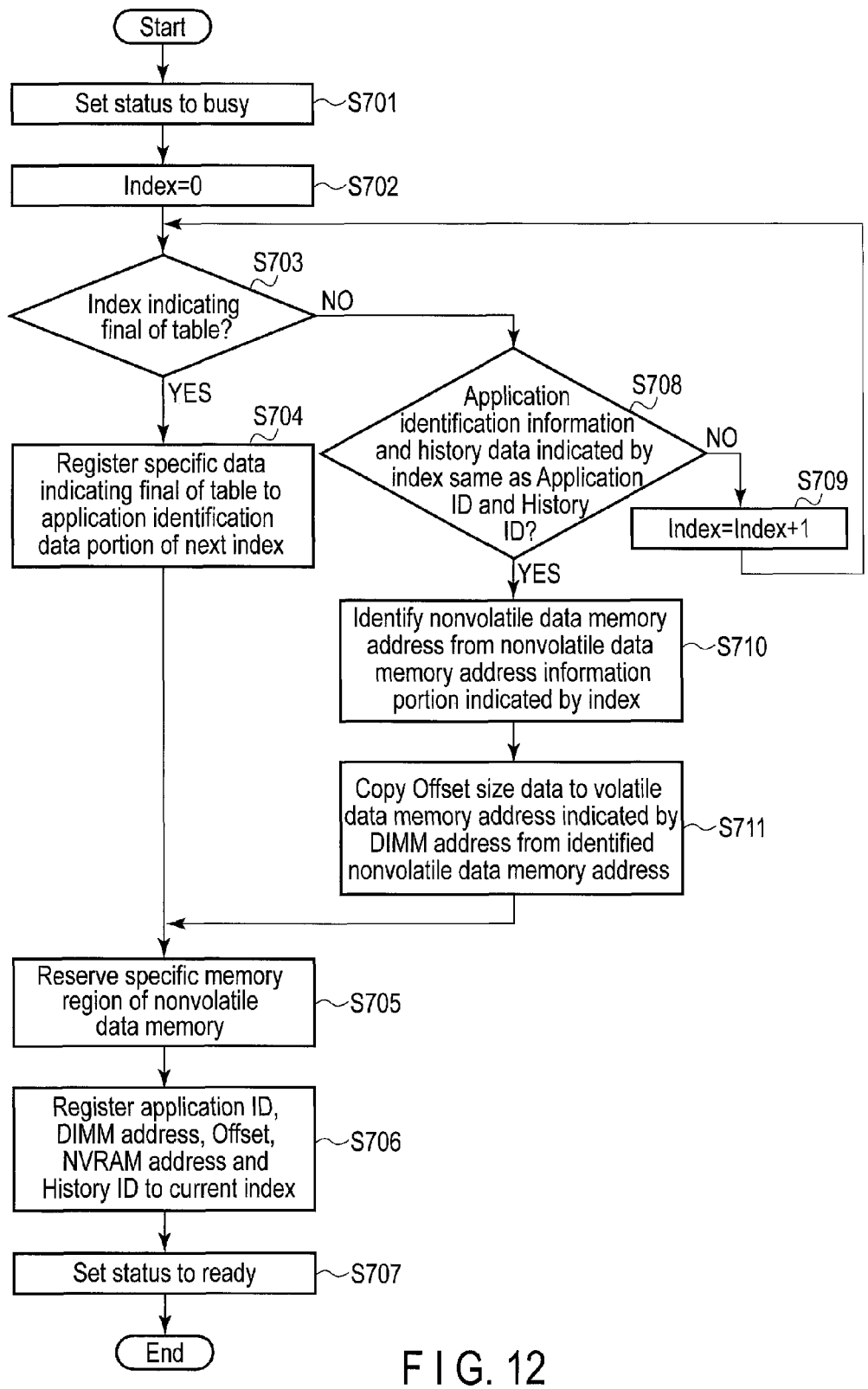
F I G. 12

US 9,946,610 B2

MEMORY DEVICE AND METHOD FOR SAVING AND RESTORING DATA USING NONVOLATILE MEMORY

CROSS-REFERENCE TO RELATED APPLICATIONS

This application is based upon and claims the benefit of priority from Japanese Patent Application No. 2015-169090, filed Aug. 28, 2015, the entire contents of which are incorporated herein by reference.

FIELD

Embodiments described herein relate generally to a technology for backing up data in a volatile memory.

BACKGROUND

In recent years, attention has been focused on the technology for preventing data in a volatile memory such as a dynamic RAM (DRAM) from being lost by a power failure, a system crash or the like.

In order to realize such technology, a memory device with a backup function is now being developed.

However, conventionally, a technology for restoring backed-up data into an arbitrary region of a volatile memory has not been considered.

BRIEF DESCRIPTION OF THE DRAWINGS

FIG. 1 is a block diagram illustrating a structural example of a memory device according to an embodiment.

FIG. 4 is a diagram illustrating another example of saving and restoration executed by the memory device of the embodiment.

FIG. 5 is a diagram illustrating still another example of saving and restoration executed by the memory device of the embodiment.

FIG. 9 is a diagram illustrating another example of the management data table used by the memory device of the embodiment.

FIG. 11 is a diagram illustrating another example of the management data table used by the memory device of the embodiment.

FIG. 12 is a flowchart illustrating a procedure of a registration and restoration (recovery) operation executed by the controller of the memory device of the embodiment using the management data table of FIG. 11.

DETAILED DESCRIPTION

Figure 2:
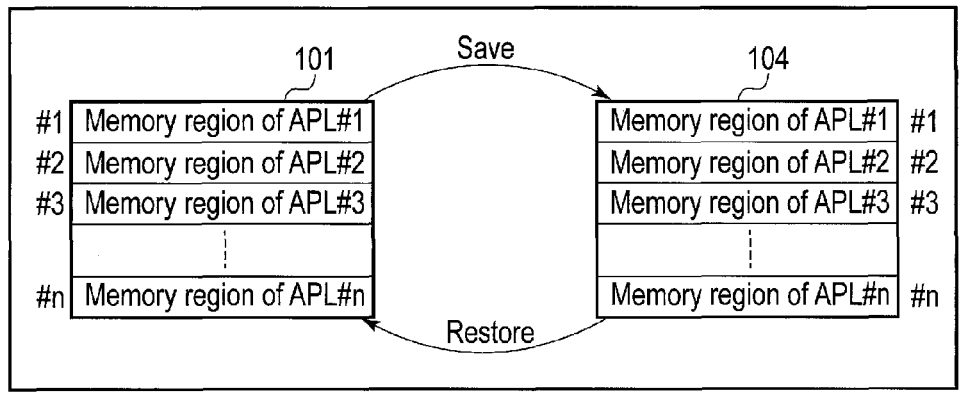
FIG. 2 is a diagram illustrating saving and restoration executed by an ordinary memory device with a backup function.

Various embodiments will be described hereinafter with reference to the accompanying drawings.

In general, according to one embodiment, a memory device comprises a volatile memory, a first nonvolatile memory, a second nonvolatile memory and a controller. The second nonvolatile memory is configured to store management data indicating a relationship between an identifier of each of programs executed by a host system and address data of each of a plurality of regions of the volatile memory being used respectively by the programs. The controller is configured to save, in response to an event of power loss, data of the volatile memory to the first nonvolatile memory. The controller is configured to receive, after recovery of power, from the host system an identifier of a first program of the programs and address data indicating a first region of the volatile memory newly allocated to the first program by the host system. The controller is configured to identify a region of the first nonvolatile memory where data of the region of the volatile memory being used by the first program before the power loss has been saved, based on the address data of the region of the volatile memory corresponding to a program having a same identifier as the identifier of the first program. The controller is configured to restore the data stored in the identified region of the first nonvolatile memory into the first region of the volatile memory.

First, with reference to FIG. 1, the structure of a memory device according to an embodiment will now be described.

A memory device 200 is realized as a dual in-line memory module (DIM), for example. DIMM is a memory module insertable into a DIMM-Standard memory socket provided in a host system 110. In more detail, the memory device 200 comprises a nonvolatile memory and can function as a non-volatile dual in-line memory module (NV-DIMM) with a backup function.

During a normal operation, the memory device 200 is regarded as an ordinary DIMM for the host system 110. In response to an event of power loss, the memory device 200 can save data of the volatile memory in the memory device 200 to a nonvolatile memory in the memory device 200.

In this manner, even if an unexpected power outage, system crash or the like occurs, the memory device 200 can permanently maintain the data of the volatile memory and thus it is possible to prevent the loss of data in the volatile memory.

Further, when the recovery of data in the volatile memory is needed, the memory device 200 can restore the data of the volatile memory from the nonvolatile memory.

In this case, the memory device 200 can restore the data of the region of the volatile memory, which has been used by an arbitrary program specified by the host system 110, into an arbitrary region (address space) in the volatile memory, specified by the host system 110.

Thus, data in a region of the volatile memory, which is used by a certain program before a power loss, can be restored into another region of the volatile memory, which is newly assigned for this program.

In this manner, even if a region of a volatile memory, different from that used before a power loss, is newly assigned for the program, the data for the program can be returned appropriately to the newly assigned region.

The host system 110 is an information processing device such as a server or a personal computer. The host system 110 comprises a memory bus controller 111, a system management (SM) bus controller 112, a power loss detector 113, CPU 114, and the like.

The memory bus controller 111 is electrically connected to a memory device 200 inserted in the memory socket, via a memory bus. The host system 110 comprises a plurality of memory sockets. FIG. 1 shows a case based on the assumption that the memory device 200 and another memory device 200' are inserted in two different memory sockets. Another memory device 200' may be an ordinary DIMM or a nonvolatile DIMM (NV-DIMM). The memory bus controller 111 can access, for write, each of the memory device 200 and the memory device 200' via a memory bus, and can access, for read, each of the memory device 200 and the memory device 200' via a memory bus, under the control of the CPU 114.

For example, the memory device 200 may be used to store data of some specific programs, which need to be backed up. When the memory device 200' is an ordinary DIMM, the memory device 200' may be used to store data of some other programs, which need not be backed up. To the memory address space of the memory device 200, regions for some application programs handling important data (critical data) may be allocated.

The SM bus controller 112 can communicate with each of the memory device 200 and the memory device 200' through the system management bus (SM bus). The SM bus is a serial bus such as I2C bus.

The SM bus controller 112 can read serial presence detect (SPD) data from each memory device via the SM bus. The SPD data includes data indicating the type of memory device, the configuration of memory device, the features of memory device, etc.

Further, the SM bus controller 112 can transmit various commands and information regarding data saving and restoration to the memory device 200 via the SM bus. Examples of these commands may include a backup command (save instruction), a restore (recovery) command, a register command. The backup command (save instruction) is a command of instructing the memory device 200 to save the data in the volatile memory into the nonvolatile memory. The restore (recovery) command is a command of instructing the memory device 200 to restore the data (memory state) of the volatile memory. The register command is a command for registering management data required for saving and restoration operation into the memory device 200. The management data to be registered by the register command includes at least an identifier of a program and address data indicating a region of the volatile memory newly allocated to the program by the host system 110.

The power loss detector 113 is configured to monitor at least the state of a memory power supplied to the memory device 200 from the host system 110. The power loss detector 113 may be configured to monitor the state of the system power of the host system 110, in addition to the state of the memory power. The SM bus controller 112 may be configured to transmit a backup command (saving instruction) to the memory device 200 via the SM bus when the power loss detector 113 detects a loss of the memory power or system power.

When a memory socket comprises a pin to which a hardware signal (save signal) for instructing a save is assigned, the hardware signal (save signal) can also be used as a save instruction. In response to a detected power loss, the host system 110 may set the hardware signal (save signal) to an active state.

The CPU 114 is a processor configured to control various components of the host system 110. The CPU 114 executes various programs. These programs include an operating system (OS) and various application programs.

The memory device 200 comprises a volatile memory 101, an SPD memory 102, an NVDIMM controller 103, a nonvolatile memory 104, a backup power source 105, a power loss detector 106, a management data nonvolatile memory 201 and the like.

The volatile memory 101 is a memory which functions as DIMM in which the data used by the host system 110 is stored. The volatile memory 101 comprises, for example, a plurality of DRAM chips.

The SPD memory 102 is a nonvolatile memory which stores SPD data. The SPD memory 102 is, for example, constituted of an E2PROM.

The NVDIMM controller 103 contains control logics configured to execute a save operation for saving data to the nonvolatile memory 104 from the volatile memory 101 and a restore operation for restoring data from the nonvolatile memory 104 in the volatile memory 101.

The NVDIMM controller 103 comprises a memory-mapped IO (MMIO) 103A for interfacing with the host system 110 via the SM bus. The MMIO 103A may include registers mapped in the memory address space.

The nonvolatile memory 104 is used to back up the data of the volatile memory 101. The nonvolatile memory 104 has a capacity more than that of the volatile memory 101. The nonvolatile memory 104 may be a NAND flash memory, or a magnetoresistive random access memory (MRAM), or other type of nonvolatile memory such as a resistive random access memory (ReRAM) or a ferroelectric random access memory (FeRAM).

The backup power source 105 is a power source which supplies to the memory device 200 power (backup power) necessary to save data to the nonvolatile memory 104 from the volatile memory 101 at the time of power loss. The backup power source 105 may be realized by a capacitor. The backup power source 105 may be incorporated in the memory device 200 or may be externally connected to the memory device 200 via a power cable.

The power loss detector 106 monitors the state of the power (memory power) supplied from the host system 110. When the power loss detector 106 detects loss of memory power, the power loss detector 106 transmits a hardware signal indicating the power loss to the NVDIMM controller 103.

The NVDIMM controller 103, in response to the event of power loss, that is, in response to the detection of the power loss by the power loss detector 106 or a save instruction from the host system 110, saves data into the nonvolatile memory 104 from the volatile memory 101. During the power loss, the memory device 200 can operate on the backup power supplied from the backup power source 105. Or in another embodiment, during power loss, the memory device 200 may operate on the backup power supplied from the host system 110.

The management data nonvolatile memory 201 is a nonvolatile memory used to store management data (management data table 201A). The management data nonvolatile memory 201 may be, for example, E2PROM.

The management data (management data table 201A) is data necessary for data save and restore operation and is registered into the management data nonvolatile memory 201 by the host system 110.

The management data table 201A shows the relationship between identifiers of a plurality of programs executed by the host system 110 and respective address data of a plurality of regions of the volatile memory 101 being used by these programs.

Let us suppose, for example, the case where a region (region #1) of the volatile memory 101 is allocated to a certain application program by the OS and another region (region #2) of the volatile memory 101 is allocated to another application program by the OS. In this case, the management data table 201A contains a management data section associated with an identifier (APL#1) of the application program and another management data section associated with an identifier (APL#2) of the other application program.

The management data section associated with the identifier (APL#1) includes the address data which indicates the region #1. This address data indicates a start address of the region #1 and the size (offset amount) of the region #1.

The management data section associated with the identifier (APL#2) includes the address data which indicates the region #2. This address data indicates a start address of the region #2 and the size (offset amount) of the region #2.

The host system 110 may instruct the NVDIMM controller 103 to register management data by accessing the MMIO 103A via the SM bus, or may register management data to the management data nonvolatile memory 201 by accessing the nonvolatile memory 201 directly through the SM bus.

Outlines of save and restore operations executed by the NVDIMM controller 103 will now be described with reference to FIGS. 2 to 4.

Figure 3:
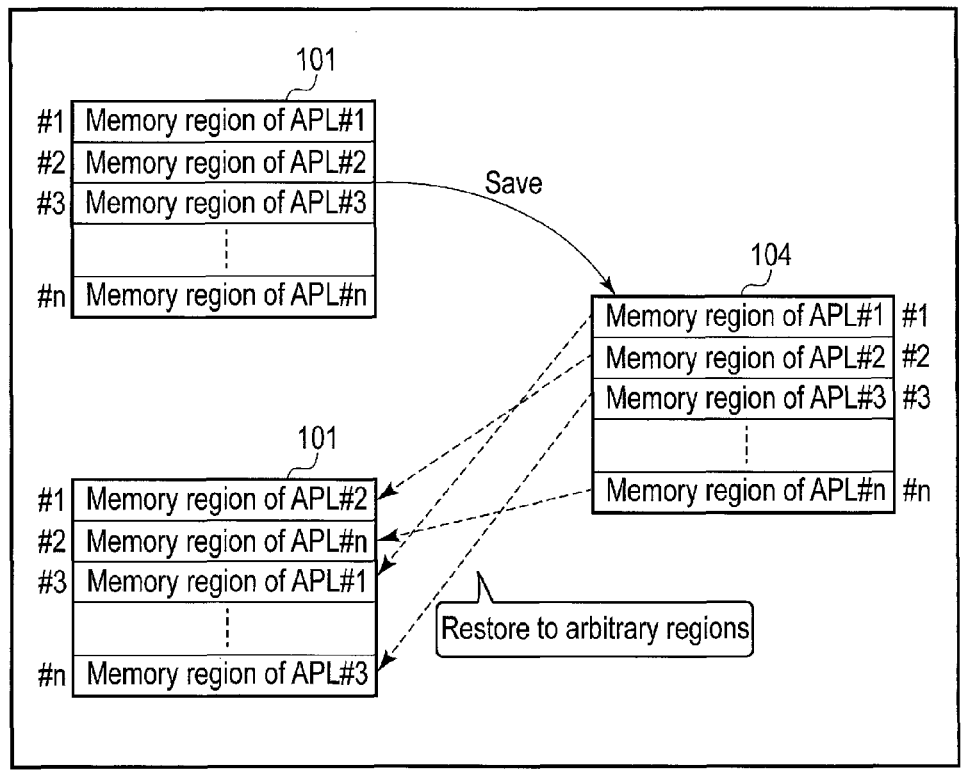
FIG. 3 is a diagram illustrating saving and restoration executed by the memory device of the embodiment.

In FIGS. 2 to 4, regions #1 to #n are illustrated in the same size for simplification of illustration, but in reality, regions #1-#n have in sizes (capacities) which required by corresponding application programs.

FIG. 2 shows the save and restore operations executed by an ordinary memory device with a backup function.

An ordinary memory device with a backup function saves data to the nonvolatile memory 104 from the volatile memory 101 and returns the saved data to the original location in the volatile memory 101. Therefore, the data (, which may be referred to as a state or a memory state) of an application program (APL#1) is restored from the nonvolatile memory 104 to the same region #1, which is the region #1 allocated to the application program (APL#1) before power loss. Similarly, the states of the other application programs are restored to the same respective regions as those allocated to the respective application programs before the power loss.

FIG. 3 shows an example of save and restore operations executed by the NVDIMM controller 103.

At the time of power loss, the NVDIMM controller 103 saves the data (all data) in, for example, the volatile memory 101 into the nonvolatile memory 104.

After recovery of the power, the NVDIMM controller 103 receives an identifier of a certain program (first program) and address data indicating a region (first region) in the volatile memory 101, newly allocated to this program (first program) by the host system 110 from the host system 110 through the MMIO 103A. Then, the NVDIMM controller 103 identifies the region in the nonvolatile memory 104 where the data of the region of the volatile memory 101 used by the first program before the power loss has been saved, based on the identifier of the first program and the management data table 201A.

Let us suppose here, for example, the case where OS newly allocates a region #1 for an application program (APL#2) after recovery of the power.

In this case, the OS notifies an identifier APL#2 of this application program and address data indicating the region #1 of the volatile memory 101 to the NVDIMM controller 103 via the MMIO 103A.

The NVDIMM controller 103 searches for, from the management data table 201A, the address data in the region of the volatile memory 101 corresponding to the application program which has the same application identifier as the received application identifier APL#2. Based on this searched address data (=address data indicating the region #2), the NVDIMM controller 103 can identify the region (region #2) of the nonvolatile memory 104 where the data of the application program (APL#2) being saved.

The NVDIMM controller 103 restores the data stored in the identified region #2 of the nonvolatile memory 104 into the region #1 of the volatile memory 101. Thus, the state of this application program (APL#2) before, the power loss, that is, the contents of the region #2 of the volatile memory 101 before the power loss can be restored from the nonvolatile memory 104 precisely into the region #1 of the volatile memory 101, newly allocated to the application program (APL#2).

Similarly, the states of the other application programs are also restored in the respective regions of the volatile memory 101 newly allocated to these application programs.

FIG. 4 shows another example of the save and restore operations executed by the NVDIMM controller 103.

The save and restore operations of FIG. 4 enable to save only the states of some specific application programs to be backed up in the nonvolatile memory 104, and to restore the states of these specific application programs in arbitrary regions of the volatile memory 101, respectively.

The management data table 201A used realize the save and restore operations of FIG. 4 shows the relationship between identifiers of one or more programs to be backed up, address data of each of one or more regions of the volatile memory 101 being used by the one or more programs, and address data of each of one or more save regions of the nonvolatile memory 104 for saving the states of the one or more programs.

Let us now suppose that the programs to be backed up are an application program (APL#2) and an application program (APL#n) and the application program (APL#2) is using the region #2 of the volatile memory 101 and the application program (APL#n) is using region #n of the volatile memory 101.

The NVDIMM controller 103 may allocate a save region #1 of the nonvolatile memory 104 for the application program (APL#2) to be backed up, or further allocate another save region #2 of the nonvolatile memory 104 for the application program (APL#n) to be backed up.

In this case, in the management data table 201A, the address data indicating the region #2 in the volatile memory 101 and the address data of the save region #1 in the nonvolatile memory 104 are registered while being associated with the application identifier APL#2. Further, address data indicating the region #n in the volatile memory 101 and address data of the save region #2 in the nonvolatile memory 104 are registered while being associated with the application identifier APL#n.

At the time of power loss, the NVDIMM controller 103 saves the data of the region #2 in the volatile memory 101 being used by the application program (APL#2) into the save region #1 in the nonvolatile memory 104 based on the management data table 201A. Further, the NVDIMM controller 103 saves the data of the region #n in the volatile memory 101 being used by the application program (APL#n) into the save region #2 in the nonvolatile memory 104 based on the management data table 201A.

After recovery of the power, the NVDIMM controller 103 receives an application identifier of a certain program (first program) and address data indicating a region (first region) in the volatile memory 101, newly allocated to this program (first program) by the host system 110, from the host system 110 via the MMIO 103A.

Let us suppose, for example, the case where after recovery of the power, the OS newly allocates the region #2 in the volatile memory 101 to the application program (APL#n) to be backed up. In this case, the OS notifies the application identifier APL#n of this application program (APL#n) and the address data indicating the region #2 in the volatile memory 101 to the NVDIMM controller 103 via the MMIC 103A.

The NVDIMM controller 103 searches the management data table 201A for address data of a save region corresponding to an application program having the same application identifier as the application identifier APL#n.

Then, the NVDIMM controller 103 can identify the save region (save region #2) where the data of the region #n in the volatile memory 101 being used by the application program (APL#n) before the power loss has been saved, from the address data on the searched save region.

Then, the NVDIMM controller 103 restores the data stored in the save region #2 in the region #2 in the volatile memory 101.

In this manner, the state of this application program (APL#n) before the power loss, that is, the contents of the region #n in the volatile memory 101 before the power loss, can be restored from the nonvolatile memory 104 precisely in the region #2 of the volatile memory 101, newly allocated to the application program (APL#n).

Similarly, the state of the application program (APL#2) is also restored in a region #4 of the volatile memory 101 newly allocated to the application program (APL#2).

FIG. 5 shows another example of the save and restore operations executed by the NVDIMM controller 103.

Save and restore operations of FIG. 5 enable to restore either a state of an old generation of the application program to be backed up or a state of a new generation of the application program in an arbitrary region in the volatile memory 101 by applying the save and restore operations of FIG. 4 in which only the state of the application program to be backed up is saved into a specific save region of the nonvolatile memory 104.

To the management data table 201A used to realize the save and restore operations of FIG. 5, a history identifier indicating the history of the backup state of these program group may be added in addition to the application identifier of the program group to be backed up.

Let us suppose now the case where the state of the old generation of an application program (APL#3) and a state of a new generation of the application program (APL#3) are managed.

The NVDIMM controller 103 may allocate the save region #1 in the nonvolatile memory 104 to the application program (APL#3) to be backed up. The NVDIMM controller 103 associates the save region #1 with the combination of the application identifier APL#3 and a history identifier (=0) and registers the save region #1, the application identifier APL#3 and a history identifier (=0) in the management data table 201A.

At the time of power loss, the NVDIMM controller 103 saves the data of a region #3 in the volatile memory 101 being used by the application program (APL#3) into the save region #1 of the nonvolatile memory 104 based on the management data table 201A.

For example, when the application program to be backed up (APL#3) is started after recovery of the power, the OS may newly allocate a region #4 of the volatile memory 101 for the application program (APL#3) to be back up. In this case, the OS notifies the application identifier APL#3, the history identifier (=0) and the address data indicating the region #4 in the volatile memory 101 to the NVDIMM controller 103 via the MMIO 103A.

The NVDIMM controller 103 searches for the address data on the save region associated with the combination of the application identifier APL#3 and the history identifier (=0), from the management data table 201A. Thus, the NVDIMM controller 103 can identify the save region (save region #1) of the nonvolatile memory 104 where the data of the region #3 in the volatile memory 101 being used before the power loss by the application program (APL#3) has been saved, based on the address data on the searched save region.

The NVDIMM controller 103 restores the data stored in the identified save region #1 of the nonvolatile memory 104 into the region #4 of the volatile memory 101.

The application program (APL#3) can be operated using the region #4 of the volatile memory 101.

The OS may transmit the application identifier APL#3, a history identifier (=1) and the address data of the region #4 in the volatile memory 101 to the NVDIMM controller 103. The NVDIMM controller 103 may allocate an unused save region of the nonvolatile memory 104, that is, for example, a save region #3 as a save region to save the state of the new generation of the application program (APL#3). Thus, the NVDIMM controller 103 registers into the management data table 201A, the application identifier APL#3, the history identifier (=1), the address data of the region #4 of the volatile memory 101 and the address data indicating save region #3.

The contents of the region #4 of the volatile memory 101 are updated during execution of the application program (APL#3).

After this, if, for example, a power loss such as an unexpected power outage, occurs, the NVDIMM controller 103 saves into the newest save region #3 for the application program (APL#3), the data of the region #4 being used by the application program (APL#3). Thus, while maintaining the state of the old generation of the application program (APL#3) in the save region #1, the state of the new generation of the application program (APL#3) can be saved into another save region (here, save region #3) of the nonvolatile memory 104.

After recovery of the power, when the identifier APL#3 of the application program (APL#3), a history identifier (0 or 1) which specifies either one of the old generation and the new generation and the address data indicating a region (for example, region #7) of the volatile memory 101 newly allocated to the application program (APL#3) are received from the host system 110, the NVDIMM controller 103 restores the state of the application program (APL#3) corresponding to the generation specified by the history identifier (0 or 1) in the region (for example, region #7) of the volatile memory 101.

In more detail, if the history identifier indicates 0, the NVDIMM controller 103 restores the data stored in the save region #1 associated with the combination of the application identifier APL#3 and the history identifier (=0) in the region #7 of the volatile memory 101. On the other hand, if the history identifier indicates 1, the NVDIMM controller 103 restores the data stored in the save region #3 associated with the combination of the application identifier APL#3 and the history identifier (=1) in the region #7 of the volatile memory 101.

Figure 6:
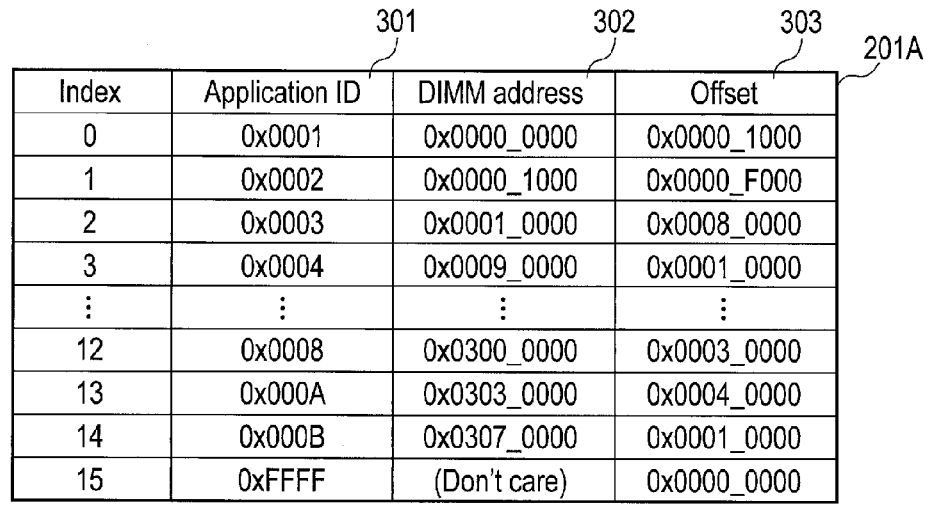
FIG. 6 is a diagram illustrating an example of a management data table used by the memory device of the embodiment.

FIG. 6 shows an example of the data structure of the management data table 201A applied to the save and restore operations illustrated in FIG. 3.

The management data table 201A contains a plurality of entries (storage areas) to which indexes of different values are given. Each entry includes an application ID field 301, a DIMM address field 302 and an offset field 303.

The application ID field 301 is an application identification data portion configured to hold application identifiers. As an application identifier (application ID), any types of data which can identify individual applications can be used. As described above, the application identifier may be a number and may be a character code.

FFFF is an invalid application identifier and "application identifier=FFFF" is set to the last entry of the management data table 201A. The "application identifier=FFFF" is specific data indicating that this entry is the last entry of the table.

The DIMM address field 302 and the offset field 303 are volatile data memory address data portions configured to hold address data indicating a region of the nonvolatile memory 101 being used by the corresponding application program. DIMM address set to the DIMM address field 302 indicates start address of this region and the offset set to the offset field 303 indicates the size of this region.

Figure 7:
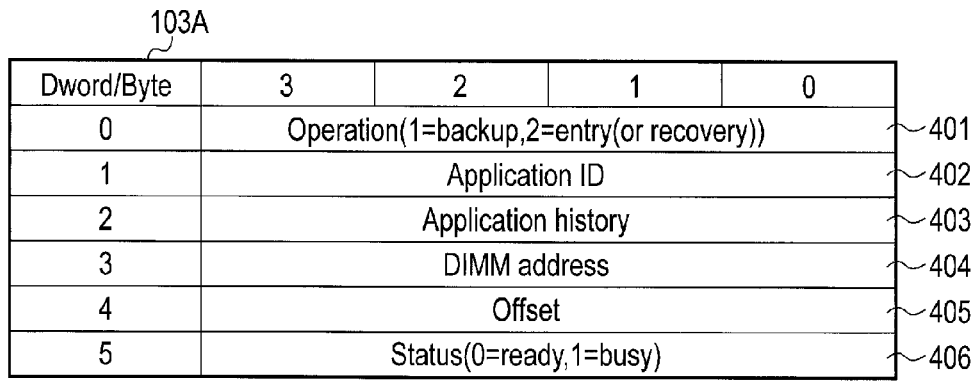
FIG. 7 is a diagram illustrating an example of contents of a memory-mapped 10 for an interface between the memory device of the embodiment and a host system.

FIG. 7 shows an example of the MMIO 103A used for interface between the memory device 200 and the host system 110.

A register file of the MMIO 103A includes an operation field 401, an application ID field 402, an application history field 403, a DIMM address field 404, an offset field 405 and a status field 406.

The host system 110 writes an operation code (command) to the operation field 401 of the MMIO 103A via the SM bus. Usable types of operation codes (command) may include a backup command and a register (entry) command. The backup command requests the memory device 200 to save data into the nonvolatile memory 104 from the volatile memory 101. The register (entry) command requests the memory device 200 to register management data. This register (entry) command can be used as a recovery command which requesting the memory device 200 to restore the state of a specific application program.

The host system 110 writes the application identifier of an application program to be registered or restored (recovery) into the application ID field 402 of the MMIO 103A.

The host system 110 writes the history identifier of the application program to be registered or restored (recovery) into the application history field 403 of the MMIO 103A if needed.

The host system 110 writes the DIMM address of the region of the volatile memory 101 (newly) allocated to the application program to be registered or restored (recovery) into the DIMM address field 404 of the MMIO 103A. The DIMM address indicates the start address of this region.

The host system 110 writes the offset (size) of the region of the volatile memory 101 (newly) allocated to the application program to be registered or restored (recovery) into the offset field 405 of the MMIO 103A.

The status field 406 of the MMIO 103A is used to notify the current status of the NVDIMM controller 103 to the host system 110.

If an application identification data portion containing the same application identifier as the application identifier in the management data which is requested to be registered is already present in the management data table 201A, there is a possibility that the state (backup data) of the application program corresponding to this application identifier exists in the nonvolatile memory 104. Therefore, in this case, the NVDIMM controller 103 restores the state (backup data) of this application program in the region in the nonvolatile memory 104, which starts from the DIMM address within the management data requested to be registered.

When an application program is started on the host system 110, the OS creates a specific application identifier which can identify this application program. The application program requests the OS to allocate a necessary memory capacity and waits for a reply from the OS.

When the OS receives the request of this memory allocation, the OS determines a specific region (memory region) in the volatile memory 101, to be allocated to this application program. The OS registers the management data regarding this determined region into the management data table 201A via the MMIO 103A.

For example, the OS writes a register command, the application identifier of this application program, the DIMM address of this region and the offset (size) of this region to the operation field 401, the application ID field 402, the DIMM address field 404, and the offset field 405 in the MMIO 103A. Then, the OS waits for the NVDIMM controller 103 to store this management data in the management data nonvolatile memory 201. In this case, the OS may wait until the value of the status field 406 changes to a value indicating the ready while polling the status field 406.

When the NVDIMM controller 103 receives the register command from the host system 110, the NVDIMM controller 103 sets to the status field 406 a value indicating the busy and executes processing for registering management data into the management data table 201A. In this case, if the application identification data portion containing the same application identifier as the application identifier within the management data requested to be registered is already present in the management data table 201A, the NVDIMM controller 103 executes the restore process.

When the NVDIMM controller 103 completes the register process or both of the restore process and register process, the NVDIMM controller 103 sets the value indicating the ready to the status field 406.

When the status field 406 changes to the value indicating the ready, the OS notifies the specified region (memory region) in the volatile memory 101 to the application program to reply to the memory allocation request. The application program, which has been waiting for the reply from the OS, can use the notified memory region.

Thus, the data indicating the memory regions of applications to which regions in the volatile memory 101 are allocated are registered into the management data table 201A.

When the power loss detector 113 of the host system 110 detects a power loss, the host system 110 writes the backup command to the operation field 401 of the MMIO 103A via the SM bus controller 112.

When the backup command is written in the operation field 401 or when the power loss detector 106 of the memory device 200 detects a power loss, the NVDIMM controller 103 copies, for example, all the data of the volatile memory 101 onto the nonvolatile memory 104 and thus saves the data of the volatile memory 101 to the nonvolatile memory 104. During this save operation, the memory device 200 is operated by the backup power from the backup power source 105. If save operation is completed, the memory device 200 is set in the zero power state.

Figure 8:
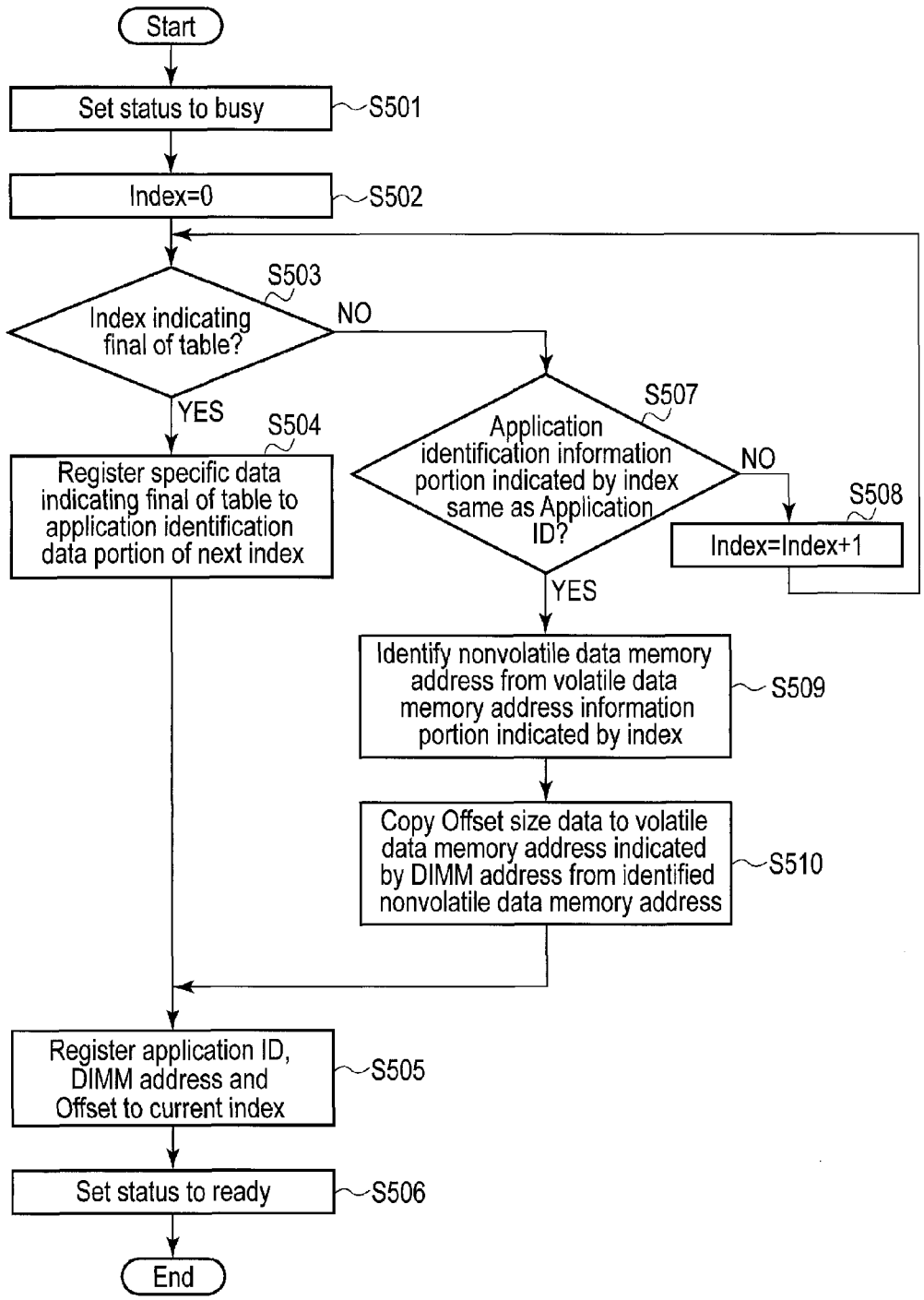
FIG. 8 is a flowchart illustrating a procedure of a registration and restoration (recovery) operation executed by a controller of the memory device of the embodiment.

Next, an example of the procedure of the register and restore (recovery) operations executed by the NVDIMM controller 103 will be provided with reference to the flowchart of FIG. 8. The procedure of the register and restore (recovery) operations corresponds to that of the save and restore operations described in FIG. 3.

When the NVDIMM controller 103 receives a register command (such as application ID, DIMM address and offset) from the host system 110 via the MIMO 103A, the NVDIMM controller 103 sets the value indicating the busy to the status field 406 of the MIND 103A (Step S501).

The NVDIMM controller 103 searches the management data table 201A for an application identification data portion (application ID field) containing the same application ID as the application ID specified by the register command. That is, the NVDIMM controller 103 refers the entry groups of the management data table 201A consecutively while increasing the value of the index (Step S502, S503, S507 and S508).

If the current index reaches the last entry of the management data table 201A while the application identification data portion containing the same application ID as the application ID specified by the register command has not been found (YES in Step S503), the NVDIMM controller 103 adds the management data (application ID, DIMM address and offset) specified by the register command to the management data table 201A.

In more detail, the NVDIMM controller 103 adds a new entry immediately after the last entry of the management data table 201A and registers a specific data indicating the last entry of the table to the application identification data portion in this new entry (Step S504). Then, the NVDIMM controller 103 registers the management data (application ID, DIMM address and offset) specified by the register command in the entry corresponding to the current index, i.e., one previous entry to the newly added entry (Step S505). Further, the NVDIMM controller 103 writes the value indicating the ready to the status field 406 (Step S506).

On the other hand, if the application ID in the application identification data portion corresponding to the current present index is the same as the application ID specified by the register command (YES in Step S507), the NVDIMM controller 103 finishes the search processing. The NVDIMM controller 103 identifies a region (nonvolatile data memory address) of the nonvolatile memory 104 where the data of the application program of the application ID specified by the register command has been saved, based on the volatile data memory address data portion (DIMM address and offset) corresponding to the current index (Step S509). In other words, the NVDIMM controller 103 identifies the region of the nonvolatile memory 104 where the data of the application program has been saved, from the address data of the region of the volatile memory 101 corresponding to the application program having the same ID as the application ID specified by the register command. In this embodiment, the address space of the volatile memory 101 and the address space of the nonvolatile memory 104 correspond by one to one. Therefore, the volatile data memory address data portion (DIMM address and offset) corresponding to the current index can be identified as the address data (nonvolatile data memory address) indicating the region (save region) of the nonvolatile memory 104 where the data of the corresponding application program has been saved.

Thus, the NVDIMM controller 103 searches for the address data of the region of the volatile memory 101 corresponding to the application program having the same ID as the application ID specified by the register command, from the management data table 201A, and identifies the region (save region) of the nonvolatile memory 104 where the data of the region of the volatile memory 101 being used before the power loss by the application program of the application ID specified by the register command has been saved, based on the searched address data.

The NVDIMM controller 103 restores the data stored in the identified region (save region) of the nonvolatile memory 104 in the region of the volatile memory 101 specified by the DIMM address and the offset of the register command (Step S510). Since the DIMM address of a register command is address data which specify the region of the volatile memory 101 newly allocated to the application program, the state of the application program is restored in the newly allocated region of the volatile memory 101.

In Step S510, the NVDIMM controller 103 copies the data of the size indicated by the offset from the identified nonvolatile data memory address onto the volatile data memory address specified by the DIMM address of the register command.

After that, the NVDIMM controller 103 registers the management data (application ID, DIMM address and offset) specified by the register command into the entry corresponding to the current index (Step S505). Thus, after the state of the application program is restored, the management data table 201A is updated automatically. As a result, the contents (DIMM address) of the searched volatile data memory address data portion (management data section) are changed into the newest DIMM address specified by the register command, that is, the DIMM address at which the state of the application program has been restored.

Then, the NVDIMM controller 103 writes the value indicating the ready to the status field 406 of the MIMO 103A (Step S506).

Note that the case where a register command serves as both a register command and a recovery command is exemplified here, but the host system 110 may transmit a recovery command including an application ID, a DIMM address and an offset to the NVDIMM controller 103 after the power is recovered.

For example, if the OS is started after the recovery of the power, and the start of a certain application program is requested by the user, the OS allocates new DIMM address and offset to this application program. In this case, the host system 110 may write the recovery command, the application ID, new DIMM address and offset of this application program to the MMIO 103A.

In this case also, steps S509, S510, S505 and S506 are executed by the NVDIMM controller 103.

With the above-described processing, even in the case where, after the power is recovered, a new DIMM address different from the DIMM address before the power loss is allocated to an application program, the state of this application program before the power loss can be restored in the region of the nonvolatile memory 101, which corresponds to the new DIMM address.

FIG. 9 shows an example of the data structure of the management data table 201A applied to the save and restore operations illustrated in FIG. 4.

In the management data table 201A of FIG. 9, character codes are used as application IDs, but the example is note limited to this. For example, the application ID may be a number.

In the management data table 201A of FIG. 9, an NVRAM address field 304 is added in addition to the application ID field 301, the DIMM address field 302 and the offset field 303.

The character code of "final" is an invalid application identifier and "application identifier=final" is set to the last entry of the management data table 201A. The "application identifier=final" is specific data indicating that this entry is the last entry of the table.

As described above, the DIMM address field 302 and the offset field 303 are volatile data memory address data portions to hold the address data indicating the region of the nonvolatile memory 101 used by a corresponding application program.

The NVRAM address field 304 and the offset field 303 are nonvolatile data memory address data portions to hold the address data indicating the region (save region) of the nonvolatile memory 104 allocated to the application program.

The host system 110 transmits not all the application programs but only the management data (application ID, DIMM address and offset) of those application programs need to be backed up to the memory device 200. A started application program may transmit a memory allocation request together with the data indicating whether or not the application required to be backed up, to the OS. Thus, the OS can easily specify an application program required to be backed up, and transmit the management data (application ID, DIMM address, offset) of only the application programs required to be backed up, to the memory device 200.

With regard to the allocation of an NVRAM address, the NVDIMM controller 103, for example, may automatically select from unused regions of the nonvolatile memory 104, a specific memory region (save region) allocated to the application program required to be backed up. In this case, a start address of the specific memory region in the nonvolatile memory 104 is registered into the NVRAM address field 304.

Or not only the application ID, DIMM address and offset, but the NVRAM address may be transmitted from the host system 110 to the memory device 200. Various methods are usable as the method for transmitting a NVRAM address to the memory device 200 from the host system 110. For example, the field for writing the NVRAM address to the MMIO 103A of FIG. 6 may be added.

When a backup command is written into the operation field 401 or when the power loss detector 106 of the memory device 200 detects a power loss, the NVDIMM controller 103 specifies, for each application program which should be backed up, a region in the nonvolatile memory 101 allocated to such an application program and a save region in the nonvolatile memory 104 allocated to such an application program with reference to the management data table 201A of FIG. 9. Then, the NVDIMM controller 103 saves the state of each application program to be backed up from the regions of the nonvolatile memory 101 to the save regions of the nonvolatile memory 104. During the save operation, the memory device 200 is operated by the backup power from the backup power source 105. When the save operation is completed, the memory device 200 is set to the zero power state.

Since only the data of the region of the volatile memory 101 being used by the application programs required to be backed up instead of all the data is saved, the time required for the save operation can be shortened.

Figure 10:
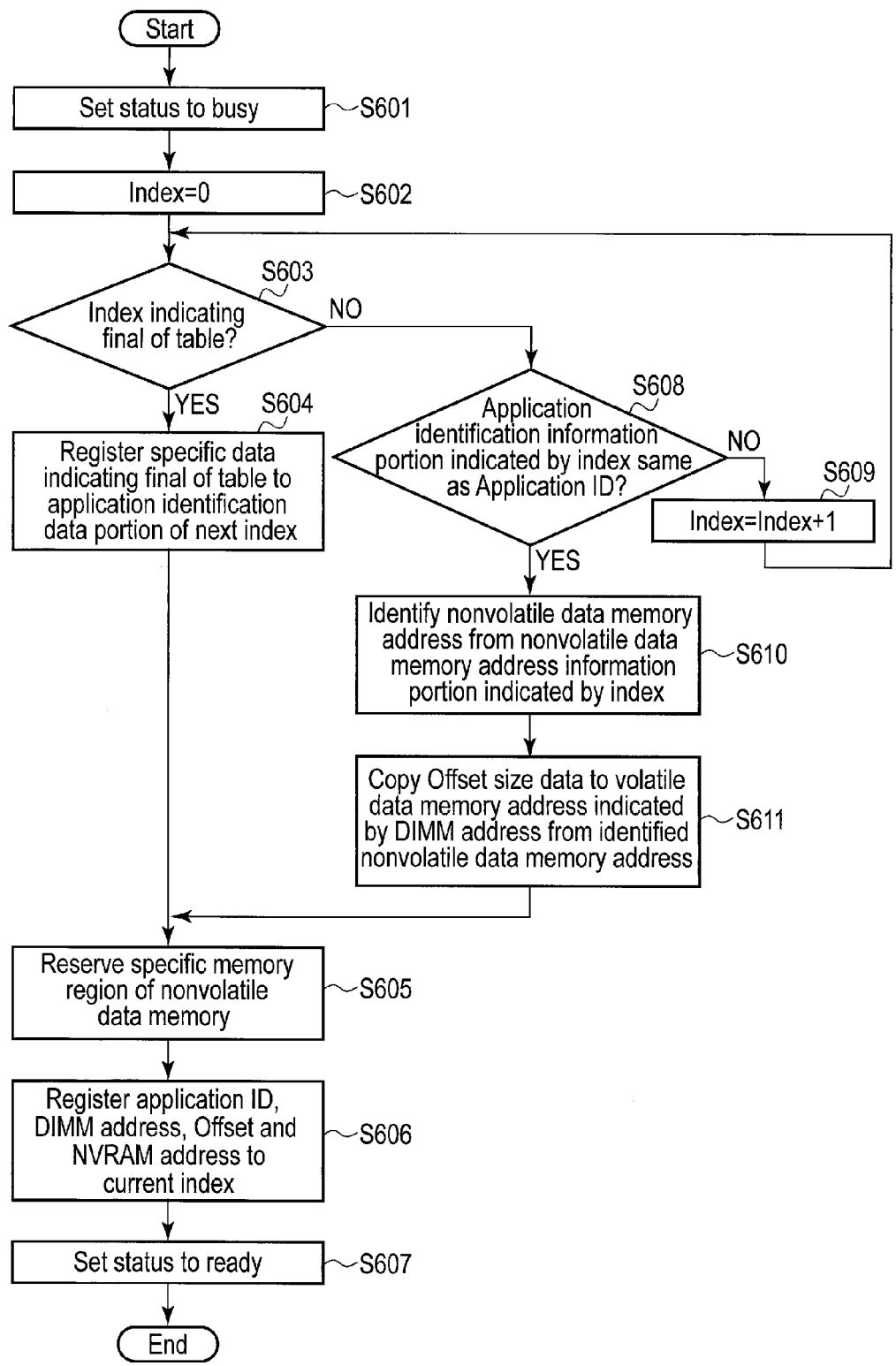
FIG. 10 is a flowchart illustrating a procedure of a registration and restoration (recovery) operation executed by the controller of the memory device of the embodiment using the management data table of FIG. 9.

Next, with reference to the flowchart of FIG. 10, an example of the procedure of the register and restore (recovery) operations executed by the NVDIMM controller 103 will be described. The procedure of the register and restore (recovery) operations corresponds to the save and restore operations illustrated in FIG. 4.

If the NVDIMM controller 103 receives a register command (application ID, DIMM address and offset) from the host system 110 via the MIMO 103A, the NVDIMM controller 103 sets the value indicating the busy to the status field 406 of the MIMO 103A (Step S601).

The NVDIMM controller 103 searches the management data table 201A for the application identification data portion (application ID field) having the same application ID as the application ID specified by the register command. That is, the NVDIMM controller 103 refers to the entry groups of the management data table 201A one by one while increasing the value of the index (Steps S602, S603, S608 and S609).

If the current index reaches the last entry of the management data table 201A while the application identification data portion containing the same application ID as the application ID specified by the register command has not been found (YES in Step S603), the NVDIMM controller 103 adds the management data (application ID, DIMM address and offset) specified by the register command to the management data table 201A.

In more detail, the NVDIMM controller 103 adds a new entry immediately after the last entry of the management data table 201A and registers a specific data indicating the last entry of the table to the application identification data portion in this new entry (Step S604). The NVDIMM controller 103 reserves a specific memory region (save region) in the nonvolatile memory 104 (Step S605). In Step S605, the NVDIMM controller 103 may select automatically a specific memory region (save region) to save the data of the application program specified by the register command, from unused regions of the nonvolatile memory 104. Or if the NVRAM address is contained in the management data specified by a register command, the NVDIMM controller 103 may reserve a specific memory region based on this NVRAM address and offset.

Then, the NVDIMM controller 103 registers the management data (application ID, DIMM address and offset) specified by the register command and the NVRAM address corresponding to the specific memory region in the entry corresponding to the current index, that is, one previous entry to the new entry added (Step S606). Further, the NVDIMM controller 103 writes the value indicating the ready to the status field 406 (Step S607).

On the other hand, if the application ID in the application identification data portion corresponding to the current index is the same as the application ID specified by the register command (YES in Step S608), the NVDIMM controller 103 finishes the search processing. Then, the NVDIMM controller 103 identifies a save region (nonvolatile data memory address) of the nonvolatile memory 104 where the data of the application program of the application ID specified by the register command has been saved, based on the nonvolatile data memory address data portion (NVRAM address) corresponding to the current index (Step S610).

Thus, the NVDIMM controller 103 searches for the address data (NVRAM address and offset) of the save region corresponding to the application program having the same ID as the application ID specified by the register command from the management data table 201A and identifies the searched address data (NVRAM address) as a save region of the nonvolatile memory 104 where the data of the region of the volatile memory 101 being used before the power loss by the application program of the application ID specified by the register command has been saved.

The NVDIMM controller 103 restores the data stored in the identified save region into the region of the volatile memory 101 specified by the DIMM address and offset of the register command (Step S611). Since the DIMM address of the register command is address data which specify the region of the volatile memory 101 newly allocated to this application program, the state of the application program is restored in this newly allocated region of the volatile memory 101.

In Step S611, the NVDIMM controller 103 copies the data of the size indicated by the offset from the identified nonvolatile data memory address to the volatile data memory address specified by the DIMM address of the register command.

After that, the NVDIMM controller 103 reserves a specific memory region (save region for an application whose state has been restored) in the nonvolatile memory 104 (Step S605). In Step S605, the NVDIMM controller 103 may reserve the same save region in the nonvolatile memory 104 as that before the power loss as the specific memory region based on the NVRAM address and offset in the searched entry.

The NVDIMM controller 103 registers the management data (application ID, DIMM address and offset) specified by the register command and the NVRAM address corresponding to the specific memory region into the entry corresponding to the current index (Step S606). Thus, the management data table 201A is updated automatically after the state of the application program is restored. As a result, the searched contents (DIMM address) of the volatile data memory address data portion are changed into the newest DIMM address specified by the register command, that is, the DIMM address at which the state of the application program has been restored.

Then, the NVDIMM controller 103 writes the value indicating the ready to the status field 406 of the MIMO 103A (Step S607).

Note that the case where a register command serves as both a register demand and a recovery demand is exemplified here, but the host system 110 may transmit a recovery command including an application ID, a DIMM address and offset to the NVDIMM controller 103 after the power is recovered.

For example, when the OS is started after recovery of the power and the user starts a certain application program, this application program transmits the data indicating whether this application program needs to be backed up and a memory allocation request to the OS. The OS allocates new DIMM address and offset to this application program.

If this application program needs to be backed up, the OS writes the recovery command, the application ID of this application program, the new DIMM address and the offset into the MMIO 103A and waits for the status field 406 of the MMIO 103A to become the ready.

In this case also, step S610, S611, S605, S606, and S707 described above are executed by the NVDIMM controller 103.

By the above processing, even in the case where a new DIMM address different from the DIMM address before the power loss is allocated to an application program after the power is recovered, the state of this application program before the power loss can be restored into the region of the nonvolatile memory 101, which corresponds to the new DIMM address. Further, the states of only those application programs which should backed up can be saved, the required for the save processing can be shortened. Furthermore, since the number of times of rewriting of the nonvolatile memory 104 can be controlled to a minimum, the life of the nonvolatile memory 104 can be prolonged. Still further, since the save region can be determined arbitrarily, it is possible to level out the numbers of times of rewriting of erase blocks (physical blocks) of the nonvolatile memory 104, and also prolong the life of the nonvolatile memory 104.

FIG. 11 shows an example of the data structure of the management data table 201A applied to the save and restore operations illustrated in FIG. 5.

In the management data table 201A of FIG. 11, character codes are used as application IDs, but the example is note limited to this. For example, the application ID may be a number.

In the management data table 201A of FIG. 11, an application history field 305 is added as compared to the management data table 201A of FIG. 9.

The character code of "final" is an invalid application identifier and "application identifier=final" is set to the last entry of the management data table 201A. The "application identifier=final" is specific data indicating that this entry is the last entry of the table.

As described above, the DIMM address field 302 and the offset field 303 are volatile data memory address data portions to hold the address data indicating the region of the nonvolatile memory 101 for a corresponding application program.

The NVRAM address field 304 and the offset field 303 are nonvolatile data memory address data portions to hold the address data indicating the region (save region) of the nonvolatile memory 104 allocated to the application program.

History data (history identifier) regarding the history of the backup state of an application program is set in the application history field 305. This history identifier is used to specify a specific generation in the histories of backup states of a plurality of generations such as the backup state of an old generation and the backup state of a new generation.

As for an application program which requires to manage the histories of the backup states of a plurality of generations, a plurality of management data given different history identifiers are registered into the management data table 201A. For example, for an application program of an application identifier "memory cache", the management data to which the history identifier 0 is given and the management data to which the history identifier 1 is given are registered in the management data table 201A of FIG. 11. The management data of the history identifier 0 is used to manage the state of the old generation of this application program. For example, the NVRAM address contained in the management data of the history identifier 0 indicates the save region where the state of the old generation has been saved. The management data of the history identifier 1 is used to manage the state of the new generation of this application program. For example, the NVRAM address contained in the management data of the history identifier 1 indicates the save region where the state of the new generation has been saved or the save region where the state of the new generation should be saved.

As for those application programs required to manage the backup state of only one generation, only the management data to which the history identifier 0 is given is registered into the management data table 201A.

The host system 110 transmits the management data (application ID, history ID [history identifier], DIMM address and offset) of not all the application programs but only those application programs required to be backed up to the memory device 200. A started application program may transmit a memory allocation request along with the data indicating whether this application requires to be backed up and the history ID to the OS.

For the allocation of the NVRAM address, for example, the NVDIMM controller 103 may select automatically a specific memory region (save region) to be allocated to an application program which requires to be backed up, from unused regions of the nonvolatile memory 104. In this case, the start address of this specific memory region in the nonvolatile memory 104 is registered into the NVRAM address field 304. As for the identical application programs having different history IDs, a plurality of specific memory regions corresponding respectively to these history ID are allocated.

When a backup command is written into the operation field 401 or when the power loss detector 106 of the memory device 200 detects a power loss, the NVDIMM controller 103 specifies, for each application program which should be backed up, a region in the nonvolatile memory 101 used by such an application program and a save region in the nonvolatile memory 104 allocated to such an application program with reference to the management data table 201A of FIG. 11. Then, the NVDIMM controller 103 saves the state of each application program to be backed up from the regions of the nonvolatile memory 101 to the save regions of the nonvolatile memory 104.

For the identical application programs having different history IDs, the NVDIMM controller 103 saves the states of the application programs from the regions in the volatile memory 101 to the save regions in the nonvolatile memory 104, which correspond to the newest history ID.

During the save operation, the memory device 200 is operated by the backup power from the backup power source 105. When the save operation is completed, the memory device 200 is set to the zero power state.

Since the states of only the application programs required to be backed up, instead of all the data, the time required for the save operation can be shortened.

Next, with reference to the flowchart of FIG. 12, an example of the procedure of the register and restore (recovery) operations executed by the NVDIMM controller 103 will be described. The procedure of the register and restore (recovery) operations corresponds to the save and restore operations illustrated in FIG. 5.

If the NVDIMM controller 103 receives a register command (application ID, history ID, DIMM address and offset) from the host system 110 via the MIMO 103A, the NVDIMM controller 103 sets the value indicating the busy to the status field 406 of the MIMO 103A (Step S701).

The NVDIMM controller 103 searches the management data table 201A for the same combination of an application ID and history ID as the combination of the application ID and history ID specified by the register command. That is, the NVDIMM controller 103 refers to the entry groups of the management data table 201A consecutively while increasing the value of the index (Steps S702, S703, S708 and S709).

If the current index reaches the last entry of the management data table 201A while the same combination of the application ID and history ID as the combination of the application ID and history ID specified by the register command has not been found (YES in Step S703), the NVDIMM controller 103 adds the management data (application ID, history ID, DIMM address and offset) specified by the register command to the management data table 201A.

In more detail, the NVDIMM controller 103 adds a new entry immediately after the last entry of the management data table 201A and registers a specific data indicating the last entry of the table to the application identification data portion in this new entry (Step S704). The NVDIMM controller 103 reserves a specific memory region (save region for the application specified by the register command) in the nonvolatile memory 104 (Step S705). In Step S705, the NVDIMM controller 103 may select automatically a specific memory region to be allocated to the application specified by the register command from unused regions of the nonvolatile memory 104.

Then, the NVDIMM controller 103 registers the management data (application ID, history ID, DIMM address and offset) specified by the register command and the NVRAM address corresponding to the specific memory region into the entry corresponding to the current index, that is, one previous entry to the new entry added (Step S706). Further, the NVDIMM controller 103 writes the value indicating the ready to the status field 406 of the MIMO 103A (Step S707).

On the other hand, if the combination of the application ID and history ID corresponding to the current index is the same as the combination of the application ID and history ID specified by the register command (YES in Step S708), the NVDIMM controller 103 finishes the search processing. Then, the NVDIMM controller 103 identifies a save region (nonvolatile data memory address) of the nonvolatile memory 104 where the data of the region the volatile memory 101 being used by the application program corresponding to the combination of the application ID and history ID specified by the register command has been saved, based on the nonvolatile data memory address data portion (NVRAM address) corresponding to the current index (Step S710).

Thus, the NVDIMM controller 103 searches for the entry associated with the same combination of the application ID and history ID as the combination of the application ID and history ID specified by the register command, from the management data table 201A, and identifies the save region in the nonvolatile memory 104 indicated by the searched entry as a save region of the nonvolatile memory 104 where the state of the application program corresponding to the combination of the application ID and history ID specified by the register command has been saved.

The NVDIMM controller 103 restores the data stored in the identified save region into the region of the volatile memory 101 specified by the DIMM address of the register command (Step S711).

Then, the NVDIMM controller 103 reserves a specific memory region (save region for applications the states of which have been restored) in the nonvolatile memory 104 (Step S705). In Step S705, the NVDIMM controller 103 may also reserve the same region in the nonvolatile memory 104 as that before the power loss as a specific memory region based on the NVRAM address and offset in the searched entry.

Then, the NVDIMM controller 103, registers the management data (application ID, history ID, DIMM address and offset) specified by the register command and the NVRAM address corresponding to the specific memory region into the entry corresponding to the current index, that is, one previous entry to the new entry added (Step S706). Thus, after the state of the application program is restored, the DIMM address in the searched entry is updated by the newest DIMM address (DIMM address at which the state of the application program has been restored) specified by the register command. Then, the NVDIMM controller 103 writes the value indicating the ready to the status field 406 of the MIND 103A (Step S707).

Note that after the backup data of certain application is restored, the OS may transmit to the management data table 201A via the MMIO 103A the application identifier of this application, a history identifier obtained by adding +1 to the current history identifier of this application, the DIMM address and the offset indicating the region where the backup data of this application program is restored. In this case, the NVDIMM controller 103 may allocate the save region for saving the state of the new generation of this application program.

After that, if a power loss occurs, the NVDIMM controller 103 saves the data of the region of the volatile memory 101 being used by this application program to the save region for saving the state of the new generation of this application program. Thus, while the state of the old generation of this application program is saved in a certain save region, the state of the new generation of this application program can be saved into another save region of the nonvolatile memory 104.

By the above processing, the state of an old generation or new generation of an application program to be backed up can be restored selectively to an arbitrary region of the volatile memory 101.

As described above, according to this embodiment, the backup data of an application program specified by an application identifier received from the host system 110 can be restored in a region in the volatile memory 101, which corresponds to the address data received from the host system 110. Therefore, even in the case where a region in the volatile memory 101 different from that before a power loss is newly allocated to an application program, the backup data of this application program can be restored precisely in a newly allocated region in this volatile memory 101 from the nonvolatile memory 104. Thus, the state of the volatile memory 101 can be restored into a state useful for the host system 110.

Note that this embodiment is described mainly in connection with the case where the contents of the region of the volatile memory 101 being used by an application program are backed up into the nonvolatile memory 104, but the contents of the region in the volatile memory 101 being used by the OS may be backed up into the nonvolatile memory 104. In this case, the contents of the region in the volatile memory 101 being used by the OS may be restored into the same specific region as the region in the volatile memory 101 used by the OS before the power loss.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a volatile memory;
a first nonvolatile memory;
a second nonvolatile memory configured to store management data indicating a relationship between an identifier of each of programs executed by a host system and an address of each of a plurality of regions of the volatile memory being allocated respectively to the programs; and
a controller configured to save, in response to an event of power loss, data of the volatile memory to the first nonvolatile memory,
wherein the controller is configured to:
receive, after recovery of power, from the host system an identifier of a first program of the programs and an address indicating a first region of the volatile memory newly allocated to the first program by the host system;
identify, based on the identifier of the first program, a region of the first nonvolatile memory where first data has been saved, wherein the first data is data of the region of the volatile memory being allocated to the first program before the power loss;
restore the first data stored in the identified region of the first nonvolatile memory into the indicated first region of the volatile memory; and
update the management data after the first data stored in the identified region of the first nonvolatile memory is restored, and change the address of the region of the volatile memory which corresponds to a program having a same identifier as the identifier of the first program to the address indicating the first region.

2. The memory device of claim 1, wherein
the controller is configured to search for the address of the region of the volatile memory corresponding to a program which has a same identifier as the identifier of the first program from the management data, and identify the region of the first nonvolatile memory where the first data has been saved, based on the searched address.

3. The memory device of claim 1, wherein the memory device is a dual in-line memory module (DIMM) insertable in a memory socket of the host system.

4. A memory device comprising:
a volatile memory;
a first nonvolatile memory;
a second nonvolatile memory configured to store management data indicating a relationship between an identifier of each of one or more programs to be backed up, an address of each of one or more regions of the volatile memory being allocated to the one or more programs, and an address of each of one or more save regions of the first nonvolatile memory for saving state of the one or more programs; and
a controller configured to save, in response to an event of power loss, data of the one or more regions of the volatile memory to the one or more save regions based on the management data,
wherein the controller is configured to:
receive, after recovery of power, from a host system an identifier of a first program of the one or more programs and an address indicating a first region of the volatile memory newly allocated to the first program by the host system;
identify a first save region of the first nonvolatile memory where data of the region of the volatile memory being allocated to the first program before the power loss has been saved, based on the identifier of the first program and the management data;
restore the data stored in the identified first save region into the indicated first region of the volatile memory; and
update the management data after the data stored in the first save region is restored, and change the address of the region of the volatile memory which corresponds to a program having a same identifier as the identifier of the first program to the address indicating the first region.

5. The memory device of claim 4, wherein
the controller is configured to search for an address of a save region corresponding to a program having a same identifier as the identifier of the first program from the management data, and identify the searched address as an address of the first save region.

6. The memory device of claim 4, wherein
the controller is configured to:
save the data of the first region to a second save region different from the first save region in the first nonvolatile memory, in response to an event of another power loss after the data stored in the first save region is restored; and
restore, when the identifier of the first program, a history identifier specifying one of a state of an old generation of the first program and a state of a new generation of the first program, and an address indicating a region of the volatile memory newly allocated to the first program by the host system are received from the host system after recovery of power, one of the data stored in the first save region and the data stored in the second save region, into a region of the volatile memory specified by the received address, based on a generation specified by the history identifier.

7. The memory device of claim 4, wherein the memory device is a dual in-line memory module (DIMM) insertable in a memory socket of the host system.

8. A method for controlling a memory device comprising a volatile memory, a first nonvolatile memory and a second nonvolatile memory, the method comprising:
storing, into the second nonvolatile memory, management data indicating a relationship between an identifier of each of programs executed by a host system and an address of each of a plurality of regions of the volatile memory being allocated respectively to the programs;
saving, in response to an event of power loss, data of the volatile memory into the first nonvolatile memory;
receiving, after recovery of power, from the host system an identifier of a first program of the programs and an address indicating a first region of the volatile memory newly allocated to the first program by the host system;
identifying, based on the identifier of the first program, a region of the first nonvolatile memory where first data has been saved, wherein the first data is data of the region of the volatile memory being allocated to the first program before the power loss;
restoring the data stored in the identified region of the first nonvolatile memory into the indicated first region of the volatile memory; and
updating the management data after the first data stored in the identified region of the first nonvolatile memory is restored, and changing the address of the region of the volatile memory corresponding to a program having a same identifier as the identifier of the first program to the address indicating the first region.

9. The method of claim 8, wherein the identifying comprising:
searching for the address of the region of the volatile memory corresponding to a program which has a same identifier as the identifier of the first program from the management data; and
identifying the region of the first nonvolatile memory where the first data has been saved, based on the searched address.

10. The method of claim 8, wherein the memory device is a dual in-line memory module (DIMM) insertable in a memory socket of the host system.

* * * * *